United States Patent
Sakamoto (10) Patent No.: US 11,132,699 B2
(45) Date of Patent: Sep. 28, 2021

(54) APPARATUSES, METHOD, AND COMPUTER PROGRAM FOR ACQUIRING AND EVALUATING INFORMATION AND NOISE REMOVAL

(71) Applicant: HONDA MOTOR CO., LTD., Tokyo (JP)

(72) Inventor: Daisuke Sakamoto, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 110 days.

(21) Appl. No.: 16/058,378

(22) Filed: Aug. 8, 2018

(65) Prior Publication Data

US 2019/0073682 A1 Mar. 7, 2019

(30) Foreign Application Priority Data

Sep. 5, 2017 (JP) .............................. JP2017-170216

(51) Int. Cl.
G06Q 30/02 (2012.01)
G06Q 30/00 (2012.01)
G06Q 30/06 (2012.01)

(52) U.S. Cl.
CPC ......... *G06Q 30/0201* (2013.01); *G06Q 30/01* (2013.01); *G06Q 30/0282* (2013.01); *G06Q 30/0609* (2013.01)

(58) Field of Classification Search
None
See application file for complete search history.

(56) References Cited

U.S. PATENT DOCUMENTS 6,510,379 B1* 1/2003 Hasegawa .............. G01C 21/20
340/988
2006/0026054 A1 2/2006 Barel et al.
(Continued)

FOREIGN PATENT DOCUMENTS

CN 102113014 A 6/2011
CN 103455562 A 12/2013
(Continued)

OTHER PUBLICATIONS

Keechul Jung, Kwang In Kim, Anil K. Jain, Text information extraction in images and video: a survey, Pattern Recognition, vol. 37, Issue 5, 2004 (Year: 2004).*
(Continued)

*Primary Examiner* — Thomas L Mansfield
(74) *Attorney, Agent, or Firm* — Squire Patton Boggs (US) LLP (57) ABSTRACT

An evaluation apparatus includes: a provision information acquiring unit configured to acquire provision information which is associated with a target object and provided to a consumer via a medium; a post information acquiring unit configured to acquire post information posted by a poster; a noise removing unit configured to remove, as noise, at least a specific expression in the provision information from post information in which a degree of matching of the post information with the provision information is a predetermined ratio or more among pieces of post information; and an evaluation unit configured to evaluate the target object on the basis of post information whose noise has been removed by the noise removing unit.

10 Claims, 8 Drawing Sheets

(56) References Cited

U.S. PATENT DOCUMENTS

| | | | |
|---|---|---|---|
| 2011/0216216 A1 | 9/2011 | Ogawa | |
| 2012/0033875 A1* | 2/2012 | Bergman | G06T 7/11 382/164 |
| 2012/0253665 A1* | 10/2012 | Forstall | G01C 21/20 701/450 |
| 2013/0124439 A1* | 5/2013 | Yamamoto | G06N 20/00 706/12 |
| 2013/0304469 A1 | 11/2013 | Kamada et al. | |

FOREIGN PATENT DOCUMENTS

| | | | |
|---|---|---|---|
| CN | 103853824 A | 6/2014 | |
| CN | 105183869 A | 12/2015 | |
| CN | 105469282 A | 4/2016 | |
| CN | 106127507 A | 11/2016 | |
| CN | 106355455 A | 1/2017 | |
| JP | 2002-140252 A | 5/2002 | |
| JP | 2003-256449 A | 9/2003 | |
| JP | 2009-123015 A | 6/2009 | |
| JP | 2015-095249 A | 5/2015 | |
| JP | 2016-071596 A | 5/2016 | |
| JP | 2017-045380 A | 3/2017 | |

OTHER PUBLICATIONS

Indian Office Action issued in corresponding Indian Patent Application No. 201844030635 dated Nov. 9, 2020.
Japanese Office Action issued in corresponding Japanese Patent Application No. 2017-170216 dated Sep. 29, 2020.
Yasutaka Komada, "Proposal of Attribute Word Automatic Extracting Technique from Product Feedback Tweets", The 6th Forum on Data Engineering and Information Management (12th Japan Database Society Annual Meeting) [online], Institute of Electronics, Information and Communication Engineers Data Engineering Technical Committee, The Database Society of Japan, Information Processing Society of Japan Database System Study Group, May 3, 2014, DEIM Forum 2014 B5-6, Internet<URL:http://db-event.jpn.org/deim2014/final/proceedings/B5-6.pdf>.
Chinese Office Action issued in corresponding Chinese Patent Application No. 2018109831085 dated Jun. 3, 2021.

* cited by examiner

| | ADVERTISEMENT DATA | ALTERNATIVE EXPRESSION DATA |
|---|---|---|
| 1 | MAKE YOUR LIFE MORE EXCITING WITH MOTORCYCLES WITH SELF-RELIANT STABLE CONTROL FUNCTION | SELF-RELIANT MOTORCYCLE |
| 2 | PROVIDE NEW DYNAMIC AND COMFORTABLE HANDLING | HANDLING BY STEER-BY-WIRE |
| 3 | TOOK FIRST PLACE IN NEW CAR SALES CONSECUTIVELY OVER THREE YEARS FROM 2014 | NEW TYPE ABC |
| 4 | FUEL EFFICIENCY IS FURTHER IMPROVED AND LOW FUEL CONSUMPTION AND RUNNING PLEASURE ARE BOTH ACHIEVED AT HIGH LEVEL | NEW TYPE XYZ |

| PROCESSING PATTERN | SUBSTITUTION FOR ALTERNATIVE EXPRESSION | FEELING INFORMATION | COUNT |
|---|---|---|---|
| A | PRESENT | PRESENT | PRESENT |
| B | PRESENT | ABSENT | PRESENT |
| C | ABSENT | PRESENT IN CONTENTS | PRESENT |

| | ORIGINAL TEXT |
|---|---|
| SENTENCE 1 | HONDA HAS MADE UNIQUE MOTORCYCLE. |
| SENTENCE 2 | IT IS SAID THAT "MODEL EQUIPPED WITH STEER-BY-WIRE JUST ANNOUNCED PROMISES TO PROVIDE NEW DYANMIC AND COMFORTABLE HANDLING" |
| SENTENCE 3 | MODEL EQUIPPED WITH STEER-BY-WIRE JUST ANNOUNCED PROVIDES NEW DYANMIC AND COMFORTABLE HANDLING. |
| SENTENCE 4 | WE HAVE SUCCEEDED IN DEVELOPING WORLD'S FIRST SUCCESSFUL MOTORBIKE BY CHALLENGING OUR UNCOMPROMISING TECHNOLOGY. MAKE YOUR LIEF MORE EXCITING WITH MOTORCYCLES WITH SELF-RELIANT STABLE CONTROL FUNCTION. SO. INTERESTING. |
| SENTENCE 5 | [TODAY'S FEATURED NEWS] WE HAVE SUCCEEDED IN DEVELOPING WORLD'S FIRST SUCCESSFUL MOTORBIKE BY CHALLENGING OUR UNCOMPROMISING TECHNOLOGY. MAKE YOUR LIFE MORE EXCITING WITH MOTORCYCLES WITH SELF-RELIANT STABLE CONTROL FUNCTION. |
| SENTENCE 6 | NEW MODEL ABC RECEIVES SUPPORT FROM WIDE RANGE OF CUSTOMERS AND HAS CONSECUTIVELY TAKEN FIRST PLACE IN NEW CAR SALES FOR THREE YEARS SINCE 2014. THAT'S GREAT. CONGRATULATIONS!! |
| SENTENCE 7 | IN NEW MODEL XYZ IN WHICH NEWLY DEVELOPED LITHIUM ION BATTERY IS NOW ADOPTED, FUEL EFFICIENCY IS FURTHER IMPROVED AND LOW FUEL CONSUMPTION AND RUNNING PLEASURE ARE BOTH ACHIEVED AT HIGH LEVEL. LET'S SEE IT. |
| SENTENCE 8 | I WONDER IF NEW MODEL XYZ RELEASED THIS TIME WILL SELL WELL. |

(B)

| | SENTENCE AFTER ALTERNATIVE EXPRESSION DATA SUBSTITUTION | PROCESSING PATTERN |
|---|---|---|
| SENTENCE 1' | HONDA HAS MADE UNIQUE MOTORCYCLE | C |
| SENTENCE 2' | IT IS SAID TO BE "HANDLING BY STEER-BY-WIRE" | B |
| SENTENCE 3' | "HANDLING BY STEER-BY-WIRE" IS PROVIDED. THAT'S AWESOME. | A |
| SENTENCE 4' | IT IS SAID TO BE "SELF-RELIANT MOTORCYCLE." INTERESTING. | A |
| SENTENCE 5' | [TODAY'S FEATURED NEWS] "SELF-RELIANT MOTORCYCLE" | B |
| SENTENCE 6' | "NEW MODEL ABC" THAT'S GREAT. CONGRATULATIONS!! | A |
| SENTENCE 7' | "NEW MODEL XYZ" LET'S SEE IT. | B |
| SENTENCE 8 | I WONDER IF NEW MODEL XYZ RELEASED THIS TIME WILL SELL WELL. | C |

| PROCESSING TARGET DATA | INDIVIDUAL MIRROR SCORE | INDIVIDUAL THERMO SCORE |
|---|---|---|
| (PROCESSING TARGET DATA 1) NEW TYPE PRODUCT A WAS REALLY NICE. EXHIBITION IS PERFORMED AT STORE XX. NEED TO CHECK. | "PRODUCT A" × "NEW TYPE" × "CONGRATULATIONS" = 1.0 | "PRODUCT A" × "NEW TYPE" × "EXPECTED" = 1.0 |
| (PROCESSING TARGET DATA 2) NEW TYPE XX EXHIBITION WAS REALLY NICE. NEED TO CHECK. | "—" × "NEW TYPE" × "CONGRATULATION" = 0.0 | "—" × "NEW TYPE" × "EXPECTED" = 0.0 |
| (PROCESSING TARGET DATA 3) NEW TYPE PRODUCT A OF COMPANY A WAS REALLY NICE. NEED TO CHECK. | "COMPANY A" × "NEW TYPE" × "CONGRATULATION" = 0.5 "PRODUCT A" × "NEW TYPE" × "CONGRATULATION" = 0.5 | "COMPANY A" × "NEW TYPE" × "EXPECTED" = 0.5 "PRODUCT A" × "NEW TYPE" × "EXPECTED" = 0.5 |

FIG. 9

APPARATUSES, METHOD, AND COMPUTER PROGRAM FOR ACQUIRING AND EVALUATING INFORMATION AND NOISE REMOVAL

CROSS-REFERENCE TO RELATED APPLICATION

Priority is claimed on Japanese Patent Application No. 2017-170216, filed Sep. 5, 2017, the content of which is incorporated herein by reference.

BACKGROUND OF THE INVENTION

Field of the Invention

The present invention relates to an evaluation apparatus, an evaluation method, a noise removal apparatus, and a program.

Description of Related Art

In the related art, with regard to a brand used by an enterprise, an organization, and the like (hereinafter referred to as an "enterprise"), pieces of information contained in various media such as television, newspapers, magazines, and web articles are collected and a degree of exposure to the public of the brand, an image of the brand, and the like are evaluated. Evaluation of a brand in this way is useful for determining a brand strategy of an enterprise.

For example, Japanese Unexamined Patent Application, First Publication No. 2015-95249 (hereinafter referred to as Patent Document 1) suggests a brand evaluation method for collecting pieces of information on a predetermined brand which have been disclosed in media, calculating a degree of exposure of the brand to the media, a degree of brand interest in the brand which represent the public's interest, and the like, and calculating a predetermined evaluation index by integrating these.

Japanese Unexamined Patent Application, First Publication No. 2016-71596 (hereinafter referred to as Patent Document 2) discloses analyzing text on the Internet, extracting a requested sentence requested by a poster and a realized sentence obtained when the request if realized, and performing information analysis for acquiring a degree of nominal realization in which a request of a poster is fulfilled. In order to acquire the degree of walking the talk, an expression representing a hope included in the requested sentence, an expression representing an execution included in the realized sentence, and target words included in both of the requested sentence and the realized sentence are extracted.

SUMMARY OF THE INVENTION

Although information, for example, on a predetermined brand which has been disclosed in media is acquired and an evaluation index is calculated using the information analysis method described in Patent Document 1, in the evaluation method, for example, gaps between an image of a brand expected by an enterprise that is an owner of the brand and responses of the public cannot be evaluated. Furthermore, whether information which has been disclosed in media is positive or negative cannot be appropriately evaluated.

Also, although media such as television, newspapers, and magazines are emphasized in conventional brand evaluation methods, in recent years, various media including social networking services (SNS) and the like in which responses of the public appear conspicuously need be comprehensively and equally evaluated. Furthermore, even when information on a brand which has been disclosed in media is acquired, it is difficult to comprehensively and equally evaluate the information due to noise included in the acquired information.

An aspect related to the present invention was made in view of such circumstances, and an object thereof is to provide an evaluation apparatus, an evaluation method, a noise removal apparatus, and a program which evaluate gaps between an image of a brand expected by an enterprise and responses of the public (consumers) regardless of noise included in acquired information and appropriately evaluate specific content of responses of the public according to activities or the like of the enterprise.

In order to achieve the object, the present invention adopts the following aspects.

(1) An evaluation apparatus according to an aspect of the present invention includes: a provision information acquiring unit configured to acquire provision information which is associated with a target object and provided to a consumer via a medium; a post information acquiring unit configured to acquire post information posted by a poster; a noise removing unit configured to remove, as noise, at least a specific expression in the provision information from post information in which a degree of matching of the post information with the provision information is a predetermined ratio or more among pieces of post information acquired by the post information acquiring unit; and an evaluation unit configured to evaluate the target object on the basis of post information whose noise has been removed by the noise removing unit.

(2) In the above aspect (1), the specific expression may be feeling information included in the provision information.

(3) In the above aspect (2), the noise removing unit may substitute a portion in the post information including the specific expression which corresponds to the provision information with alternative information obtained by removing the feeling information from the provision information.

(4) In any one of the above aspects (1) to (3), the noise removing unit may perform weighting on attributes of portions included in the post information and the provision information.

(5) In any one of the above aspects (1) to (4), the post information acquiring unit selectively may acquire post information including impressions of the provision information.

(6) In the above aspect (5), the post information may be post information associated with impressions of provision information transmitted from a predetermined transmission source.

(7) In any one of the above aspects (1) to (6), the evaluation apparatus includes: a syntax analyzing unit configured to perform syntax analysis on a sentence included in post information which is acquired by the post information acquiring unit and whose noise has been removed by the noise removing unit; and a scoring unit configured to perform scoring on an analysis result in the syntax analyzing unit, wherein the scoring unit may associate provision information acquired by the provision information acquiring unit with the scored analysis result.

(8) In the above aspect (7), the scoring unit may perform weighting on an analysis result analyzed by the syntax analyzing unit.

(9) A noise removal apparatus according to an aspect of the present invention includes: a provision information acquiring unit configured to acquire provision information which is associated with a target object and provided to a consumer via a medium; a post information acquiring unit configured to acquire post information posted by a poster; and a noise removing unit configured to remove, as noise, at least a specific expression in the provision information from post information in which a degree of matching of the post information with the provision information is a predetermined ratio or more among pieces of post information acquired by the post information acquiring unit.

(10) An evaluation method according to an aspect of the present invention includes: acquiring, by a computer, provision information which is associated with a target object and provided to a consumer via a medium; acquiring, by the computer, post information posted by a poster; removing, by the computer, as noise, at least a specific expression in the provision information from post information in which a degree of matching of the post information with the provision information is a predetermined ratio or more among pieces of acquired post information; and evaluating, by the computer, the target object on the basis of post information whose noise has been removed.

(11) A program according to an aspect of the present invention causing a computer to execute: acquiring provision information which is associated with a target object and provided to a consumer via a medium; acquiring post information posted by a poster; removing, as noise, at least a specific expression in the provision information from post information in which a degree of matching of the post information with the provision information is a predetermined ratio or more among pieces of acquired post information; and evaluating the target object on the basis of post information whose noise has been removed.

According to the above aspects (1) to (8), (10), and (11), gaps between an image of a brand expected by an enterprise and responses of the public (consumers) can be evaluated regardless of noise included in the acquired information and specific content of responses of the public according to activities or the like of the enterprise can be appropriately evaluated. Furthermore, when gaps between the image of the brand and the responses of the public are evaluated, the gaps and certainty of information which has been disclosed in media can be appropriately evaluated and a degree of risk of the enterprise can be also evaluated.

According to the above aspect (9), noise included in the acquired information can be removed with high accuracy.

DETAILED DESCRIPTION OF THE INVENTION

An evaluation apparatus, an evaluation method, a noise removal apparatus, and a program in some embodiments according to the present invention will be described below with reference to the drawings.

Figure 1:
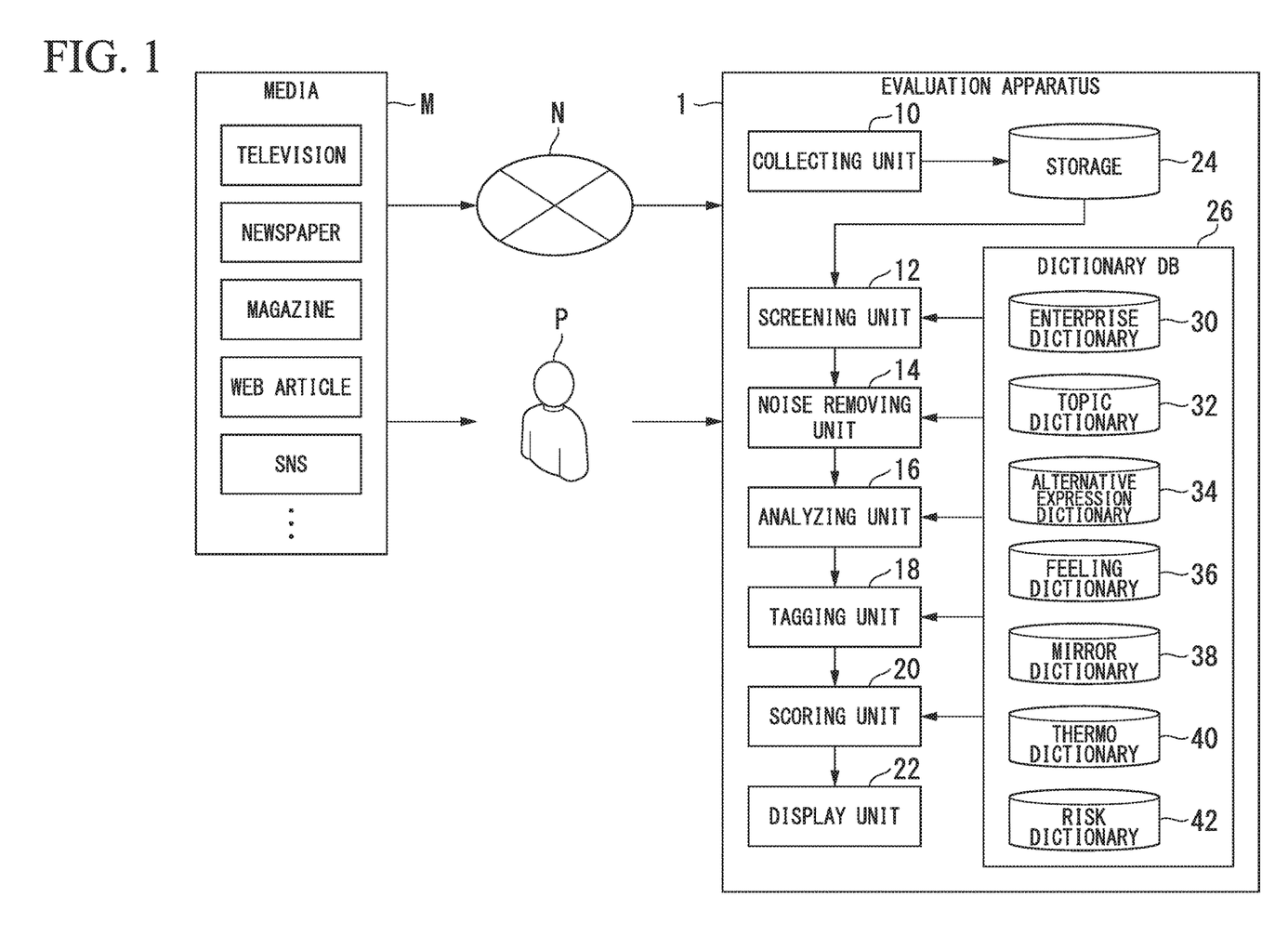
FIG. 1 is a functional block diagram illustrating an example of an evaluation apparatus according to an embodiment.

FIG. 1 is a functional block diagram illustrating an example of an evaluation apparatus 1 according to an embodiment of the present invention. The evaluation apparatus 1 collects and analyzes data to be processed (hereinafter referred to as "processing target data") from a medium M (information medium) to evaluate a brand to be evaluated. Examples of the medium M include television, newspapers, magazines, web articles, weblogs, social network services (SNSs) such as short text submission services, and reports of shareholders.

The evaluation apparatus 1 calculates three values, i.e., a "mirror score," a "thermo score," and a "risk value," as evaluation indices concerning a brand (target object). The "mirror score" refers to an index of how a brand to be evaluated is perceived by the public with respect to the content of the brand to be evaluated defined by an enterprise (transmission source) which owns the brand as how the enterprise expect the public to perceive the brand. The "mirror score" indicates a frequency of occurrence of a term which indicates what the enterprise expects. When this mirror score is calculated, gaps between an image of the brand expected by the enterprise and responses of the public can be ascertained. The responses of the public are expressed in impressions included in processing target data (post information) posted by the public (consumers) to each of the media M such as an SNS. The impressions included in the processing target data can be classified according to feeling expressions.

The "thermo score" refers to an index as to whether a sentiment (feeling) of the public according to activities of an enterprise which owns a brand to be evaluated could be improved. The "thermo score" indicates a frequency of occurrence of a term which indicates a response of the public (consumers). When this thermo score is calculated, it is possible to ascertain whether the sentiment of the public for the brand to be evaluated could be improved or whether support of the public could be obtained. The "risk value" refers to an index indicating a degree of risk occurring with respect to the brand to be evaluated. The "risk value" is calculated on the basis of a frequency of occurrence of a term representing a risk of an enterprise or an organization and a type of medium M (information medium).

The evaluation apparatus 1 includes, for example, a collecting unit 10 (provision information acquiring unit or post information acquiring unit), a screening unit 12, a noise removing unit 14, an analyzing unit 16, a tagging unit 18, a scoring unit 20 (evaluation unit), a display unit 22, a storage 24, and a dictionary database (DB) 26. The dictionary DB 26 includes, for example, an enterprise dictionary 30, a topic dictionary 32, an alternative expression dictionary 34, a feeling dictionary 36, a mirror dictionary 38, a thermo dictionary 40, and a risk dictionary 42.

The collecting unit 10 collects processing target data from each medium M and stores the processing target data in the storage 24. The collecting unit 10 collects processing target data, for example, via the Internet N. Examples of the processing target data include data posted by posters or data such as catchphrases associated with a brand which is set by an enterprise or an organization in advance. This data is, for example, advertisement data which is associated with a target object and is provided to consumers through each medium. The collecting unit 10 collects processing target data at a predetermined timing such as daily or weekly. The collecting unit 10 may selectively acquire post information including impressions in provision information in processing target data. Furthermore, a medium M serving as a collection source may be determined by a user of the evaluation apparatus 1 in advance. The collecting unit 10 may perform crawling processing for periodically collecting documents or the like including a predefined character string on the Internet. The evaluation apparatus 1 may include a receiving unit (not shown) configured to receive an input by an operator P and the collecting unit 10 may collect processing target data input to the receiving unit.

The screening unit 12 excludes processing target data which is not associated with a brand to be evaluated from processing target data collected by the collecting unit 10 and extracts processing target data associated with the brand to be evaluated. The screening unit 12 identifies and extracts data associated with a brand set by the enterprise or the organization in advance from data collected from the media M (information media). For example, the screening unit 12 may read dictionary data stored in the enterprise dictionary 30. This dictionary data is the brands to be evaluated. Moreover, the screening unit 12 excludes processing target data including homonyms of the brand. For example, the screening unit 12 may exclude processing target data acquired from a predefined specific uniform resource locator (URL), exclude processing target data acquired from a weblog and an SNS of a predefined specific identification (ID), and exclude a plurality of pieces of data including the same text as abnormal data when there are a plurality of pieces of data.

The noise removing unit 14 removes noise from text of processing target data screened by the screening unit 12. The noise included in the processing target data is feeling expressions (specific expressions) included in a portion in the processing target data in which a degree of matching of the processing target data with advertisement data (provision information) is equal to or larger than a predetermined ratio (hereinafter referred to as a "portion corresponding to advertisement data"). For example, the noise removing unit 14 may extract alternative expression data (alternative information) corresponding to a portion corresponding to advertisement data included in the processing target data from the alternative expression dictionary 34. The alternative expression data is data generated by excluding feeling expressions from advertisement data. Moreover, the noise removing unit 14 may substitute data in the processing target data which corresponds to a portion corresponding to advertisement data with alternative expression data.

Text of data in the processing target data which accompanies advertisement data, which does not include feeling expressions is also deleted. When it is difficult to determine or not whether data is data which accompanies advertisement data, data which accompanies advertisement data remains as it is without being deleted.

Feeling expressions removed by the noise removing unit 14 are feeling expressions included in advertisement data. For this reason, a feeling expression in the processing target data which is not included in a portion corresponding to advertisement data is not excluded by the noise removing unit 14. A degree of matching of the processing target data with advertisement data refers to a matching ratio between a portion corresponding to advertisement data and advertisement data in the processing target data. Therefore, for example, when a portion corresponding to advertisement data in the processing target data is 90% or more of the entire text of advertisement data, the degree of matching of the processing target data with advertisement data is 90%. A predetermined ratio for the purpose of determining whether the portion corresponding to advertisement data to remove noise can be set appropriately may be, for example, 100%, 90%, 80%, or 50%. Furthermore, a predetermined ratio may be set appropriately in accordance with conditions such as a degree of evaluation.

The analyzing unit 16 analyzes sentences of the processing target data by dividing the text included in the data to be processed at a word level and performing a morphological analysis process of associating brands having the same meaning.

For example, the analyzing unit 16 may associate alphabetic notation, notation in Chinese characters, notation in katakana in Japanese characters, notation in hiragana in Japanese characters, or the like which represent the same brand and process them as data representing the same brand. Furthermore, the analyzing unit 16 may process alphabetic representation as data representing the same brand even when there are differences between uppercase letters, lowercase letters, and mixtures of uppercase letters and lowercase letters in the alphabetic representation. The analyzing unit 16 may also process text including errors (Chinese character conversion errors or the like) as data representing a brand to be evaluated. Thus, variation in representation can be corrected.

The analyzing unit 16 ascertains a relationship between a modification source and a modification destination of words included in text and performs syntax analysis processing of interpreting a strength of the expression, multiple negation, a positive question, modification, comparison, and a dialect for words included in text. Interpretation for a strength of the expression means that, for example, in the word "extremely" in the expression "product A is extremely good" and the word "somewhat" in the expression "product A is somewhat good," the word "extremely" is interpreted as a stronger expression. Interpretation for multiple negation means that, for example, the expression including double negation such as the expression "product A is not good" is correctly interpreted as a positive expression.

Interpretation for a positive question means that, for example, a question sentence expressed as a positive intention, i.e., the expression "The product A is a good product, isn't it?" is interpreted as a positive expression. Interpretation for modification means that, for example, even when a modification relationship is reversed like in the expression "A good product is the product A, isn't it?" the meaning thereof is interpreted correctly. The expression "A good product is the product A, isn't it?" is interpreted as a positive expression.

Interpretation for comparison means that, with regard to an expression in which products A of a current model and a previous model are compared, i.e., the expression "a previous model of product A was better," it is determined that the product A is intended to be worse and thus the expression is interpreted as a negative expression. Furthermore, interpretation for a dialect means that, for example, a dialect "menkoi" in Japanese in the expression "product A is a menkoi product" is determined to be the meaning of a standard word "cute" and the meaning thereof is correctly interpreted.

The expression "product A is a menkoi product" is interpreted as a positive expression. When the above-described syntax analysis processing is performed, accuracy of semantic understanding can be increased.

The tagging unit 18 refers to the enterprise dictionary 30, the topic dictionary 32, the feeling dictionary 36, the mirror dictionary 38, the thermo dictionary 40, and the risk dictionary 42 and an analysis result of text included in each of items of processing target data is tagged with an "enterprise tag," a "topic tag," a "feeling tag," a "mirror tag," a "thermo tag," or a "risk tag." The tagging processing will be described in detail.

The scoring unit 20 performs scoring processing of calculating a mirror score, a thermo score, and a risk value on the basis of the processing target data which has been subjected to the tagging processing by the tagging unit 18. For example, the scoring unit 20 calculates a mirror score for a character string tagged with a combination of an "enterprise tag," a "topic tag," and a "mirror tag" of items of in the processing target data. For example, the scoring unit 20 calculates a thermo score for a character string tagged with a combination of an "enterprise tag," a "topic tag," and a "thermo tag" of items in the processing target data. For example, the scoring unit 20 calculates a risk value for a character string tagged with a combination of an "enterprise tag," a "topic tag," and a "risk tag" of items in the processing target data. Furthermore, for example, the scoring unit 20 calculates a risk value for a character string tagged with a combination of an "enterprise tag" and a "risk tag" of items in the processing target data.

Some or all of the collecting unit 10, the screening unit 12, the noise removing unit 14, the analyzing unit 16, the tagging unit 18, and the scoring unit 20 may be realized through a program (software) realized by a processor (computer). Furthermore, some or all of these may be realized by hardware such as a large scale integration (LSI) or an application specific integrated circuit (ASIC) or may be realized by a combination of software and hardware.

The display unit 22 displays a mirror score, a thermo score, and a risk value calculated by the scoring unit 20. The user of the evaluation apparatus 1 can evaluate a target brand by checking the mirror score, the thermo score, and the risk value displayed on the display unit 22. The display unit 22 is, for example, a liquid crystal display, an organic electroluminescence (EL) display device, or the like.

The storage 24 stores processing target data collected by the collecting unit 10. The storage 24 stores, for example, a type of media of a collection source and processing target data which are associated with each other.

The dictionary DB 26 stores dictionary data used in various processes performed by the screening unit 12, the noise removing unit 14, the analyzing unit 16, the tagging unit 18, and the scoring unit 20. The storage 24 and the dictionary DB 26 may be realized by a read only memory (ROM), a random access memory (RAM), a hard disk drive (HDD), a flash memory, or the like.

The enterprise dictionary 30 stores dictionary data on a brand owned by the enterprise, which is a brand to be evaluated. The enterprise dictionary 30 stores, for example, a term which characterizes an enterprise such as an enterprise name, a product name, a service name, and a name of an enterprise president.

The topic dictionary 32 stores dictionary data on a topic thought to be a topic of current interest amongst the public. For example, when information such as a news release concerning a brand to be evaluated is disclosed to the public, the topic dictionary 32 stores a topic described in the news release. The topic dictionary 32 stores, for example, a term associated with a brand to be evaluated such as "new model," "start of sale," "presentation," and "world presentation."

Figure 2:
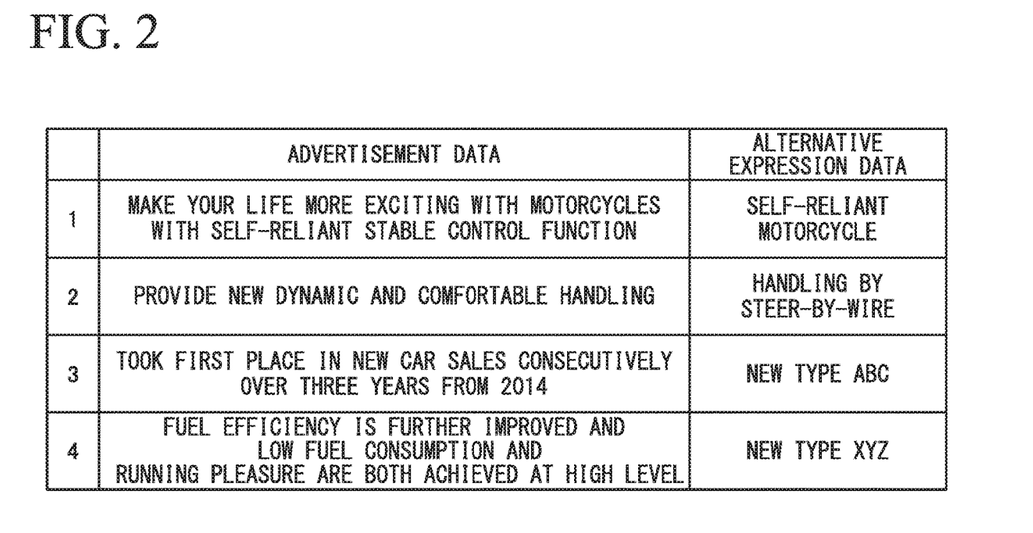
FIG. 2 is a diagram illustrating an example of advertisement data and alternative expression data stored in an alternative expression dictionary in the embodiment.

The alternative expression dictionary 34 stores text of advertisement data serving as a catchphrase which advertises a product of a brand of an enterprise or an organization and alternative expression data obtained by removing a feeling expression from the catchphrase. FIG. 2 is a diagram illustrating an example of advertisement data and alternative expression data stored in the alternative expression dictionary 34 in the embodiment. The alternative expression dictionary 34 stores advertisement data including a feeling expression and alternative expression data which is obtained by removing a feeling expression from advertisement data and substitutes advertisement data. For this reason, the alternative expression data is data which does not include a feeling expression.

The alternative expression dictionary 34 stores, for example, advertisement data No. 1, i.e., the expression "Make your life more exciting with motorcycles with a self-reliant stable control function." The advertisement data No. 1 includes a feeling expression, i.e., the word "exciting." The expression "exciting" is determined to be a feeling expression because the expression "exciting" is associated with a feeling of "exciting." The alternative expression dictionary 34 stores an alternative expression data No. 1, i.e., a "self-reliant motorcycle" which substitutes the advertisement data No. 1. The alternative expression data No. 1 is data which is obtained by removing the feeling expression, i.e., the word "exciting" from the advertisement data No. 1 and concisely shows the content of the advertisement data No. 1.

The alternative expression dictionary 34 stores advertisement data No. 2, i.e., the expression "provide new dynamic and comfortable handling." The advertisement data No. 2 includes feeling expressions, i.e., the words "dynamic" and "comfortable." Both of the words "dynamic" and "comfortable" are determined to be feeling expressions because the words "dynamic" and "comfortable" are associated with a feeling of being "good."

The alternative expression dictionary 34 stores advertisement data No. 3, i.e., the expression "Took first place in new car sales consecutively over three years from 2014." The advertisement data No. 3 includes a feeling expression, i.e., the expression "take the first place." The expression "take the first place" is determined to be a feeling expression because the expression "take the first place" is associated with a feeling of being "happy."

The alternative expression dictionary 34 stores advertisement data No. 4, i.e., the expression "fuel efficiency is further improved and low fuel consumption and running enjoyment are both achieved at a high level." The advertisement data No. 4 includes a feeling expression, i.e., the expression "are both achieved at a high level." The expression "are both achieved at a high level" is determined to be a feeling expression because the expression "are both achieved at a high level" is associated with a feeling of being "good."

The alternative expression dictionary 34 stores words including feeling expressions such as "like," "praise,"

"new," and "dislike" in addition to these and advertisement data including words associated with words including these feeling expressions.

The alternative expression dictionary 34 also stores alternative expression data corresponding to this advertisement data. The alternative expression dictionary 34 stores text included in this advertisement data at a word level.

The feeling dictionary 36 stores dictionary data used for semantic analysis of processing target data. The feeling dictionary 36 stores dictionary data required for positive and negative determination processing for processing target data performed by the scoring unit 20.

The mirror dictionary 38 stores dictionary data which defines the specific content of a brand of an enterprise requested to be received by the public and the specific content of expression of the brand requested to be represented. The mirror dictionary 38 stores, for example, a term representing at least one major classification, a term representing at least one intermediate classification associated with each major classification, and a keyword associated with each intermediate classification. This keyword is used as dictionary data. The mirror dictionary 38 need not include a data constitution, i.e., a major classification, an intermediate classification, and a keyword, may define only a major classification, may define a more detailed classification, and may store only a keyword without defining a classification.

The thermo dictionary 40 stores dictionary data for evaluating whether feeling of the public have been raised in accordance with activities of an enterprise which owns a brand to be evaluated. The thermo dictionary 40 stores terms expressing positive sentiments of the public, for example, "relief," "satisfaction," "liking," and "expectation." Furthermore, the thermo dictionary 40 stores terms representing negative sentiments of the public, for example, terms opposite to the above terms representing positive sentiments such as "anxiety," "dissatisfaction," "dislike," and "disappointment." Furthermore, the thermo dictionary 40 may store keywords associated with the above terms representing the sentiments. The thermo dictionary 40 may store, for example, the expressions "need to check," "looking forward to the future," and the like as keywords associated with the word "expectation."

The risk dictionary 42 stores dictionary data indicating a risk to be ascertained by an enterprise with respect to a brand to be evaluated. The risk dictionary 42 stores, for example, a term representing at least one major classification, a term representing at least one intermediate classification associated with each major classification, a term representing at least one minor classification associated with each intermediate classification, and a keyword associated with each minor classification. This keyword is used as dictionary data. The risk dictionary 42 need not include a data constitution, i.e., a major classification, an intermediate classification, a minor classification, and a keyword, may set only a major classification or only a major classification and an intermediate classification, may define a more detailed classification, and may store only a keyword without defining a classification.

Figure 3:
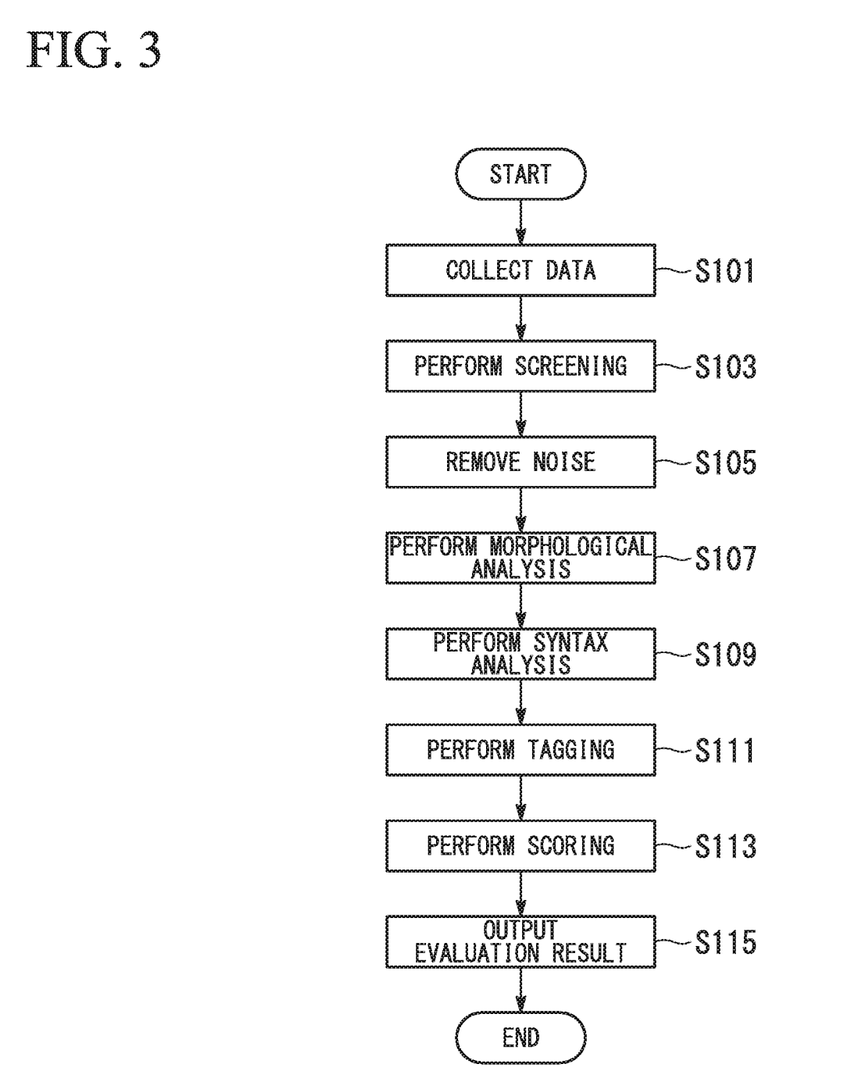
FIG. 3 is a flowchart for describing an example of a flow of processing of the evaluation apparatus according to the embodiment.

An operation of the evaluation apparatus 1 according to the embodiment will be described below. FIG. 3 is a flowchart for describing an example of a flow of processing of the evaluation apparatus 1 according to the embodiment.

First, the collecting unit 10 collects processing target data from the media M and stores the collected processing target data in the storage 24 (Step S101). The collecting unit 10 collects processing target data, for example, via the Internet N. The collecting unit 10 collects processing target data at a predetermined timing such as daily and weekly. Furthermore, the evaluation apparatus 1 may include a receiving unit (not shown) configured to receive an input by the operator P and the collecting unit 10 may collect processing target data input to the receiving unit.

Subsequently, the screening unit 12 read processing target data stored in the storage 24 and performs screening processing of excluding data which is not related to the brand to be evaluated (Step S103). For example, the screening unit 12 reads dictionary data (brand to be evaluated) from the enterprise dictionary 30 and excludes data including homonyms of the brand.

Subsequently, the noise removing unit 14 performs a process of substituting advertisement data including a feeling expression in the processing target data screened by the screening unit 12 with alternative expression data and removing a feeling expression serving as noise (Step S105).

Figure 4:
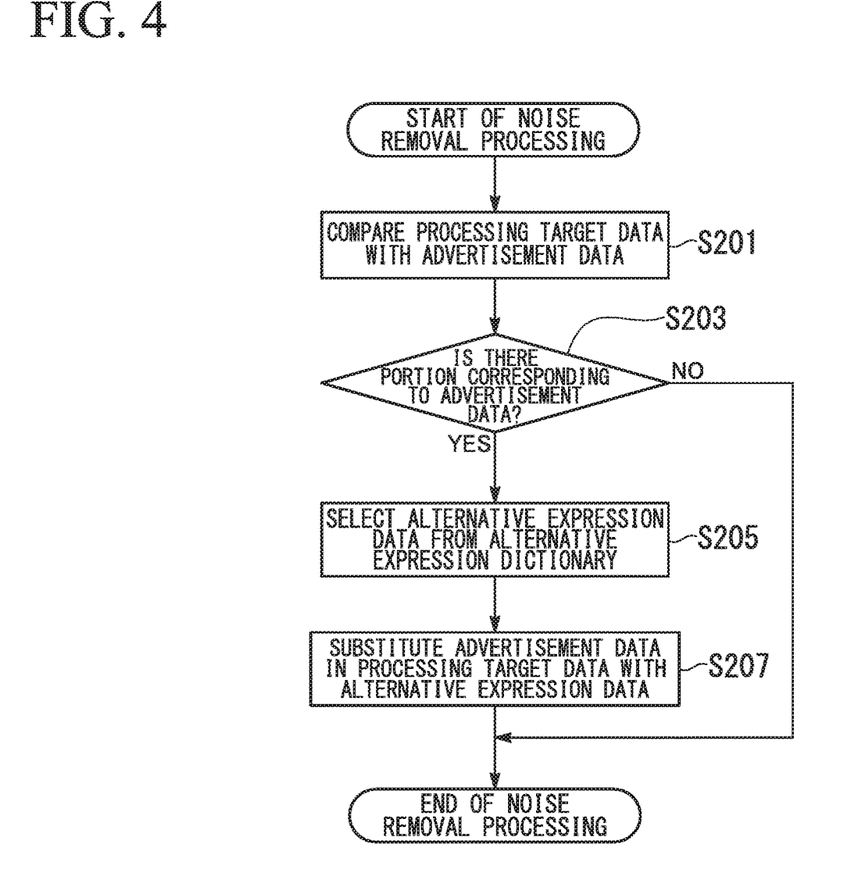
FIG. 4 is a flowchart for describing an example of a flow of noise removal processing of the evaluation apparatus according to the embodiment.

FIG. 4 is a flowchart for describing an example of a flow of noise removal processing (Step S105) of the evaluation apparatus 1 according to the embodiment. First, the noise removing unit 14 compares the processing target data screened by the screening unit 12 with advertisement data stored in the alternative expression dictionary 34 (Step S201).

When the processing target data and advertisement data are compared, the noise removing unit 14 decomposes text included in the processing target data at a word level and compares the text with text of advertisement data at a word level stored in the alternative expression dictionary 34. The noise removing unit 14 calculates a degree of matching between the processing target data and advertisement data according to an extent to which words included in the text of advertisement data are included in the processing target data.

When the degree of matching between the processing target data and advertisement data is calculated, for example, when a plurality of the same words are included in the processing target data, the noise removing unit 14 determines whether or not the same words are included in advertisement data, for example, from the context. For example, when processing target data is text, i.e., the expression "every day is more exciting with a motorcycle through a self-reliant stable control function. Every day is fun," the noise removing unit 14 determines that the word "excited" included in the expression "every day is more excited" is a word included in advertisement data (advertisement data No. 1) and determines that the word "exciting" included in the expression "Every day is fun" is not included in advertisement data (advertisement data No. 1).

Figure 5:
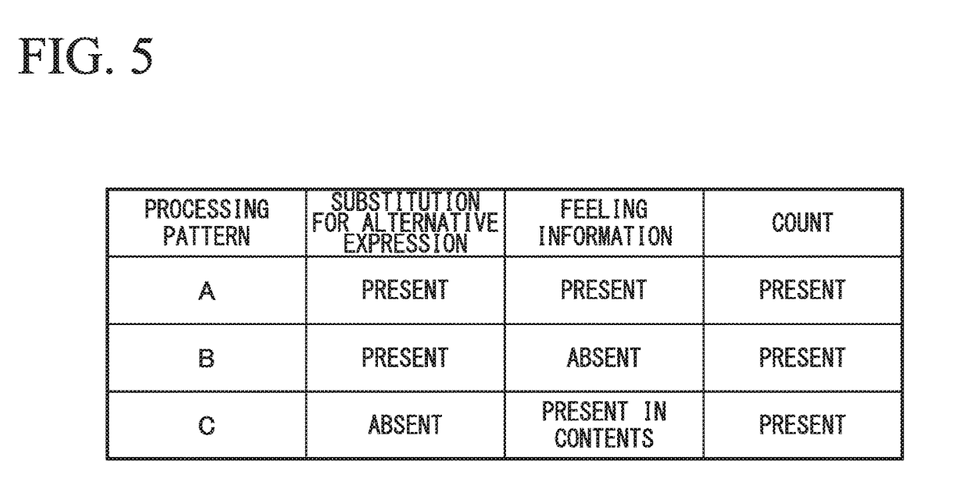
FIG. 5 is a diagram for explaining attributes of a noise removal processing pattern.

A processing pattern when noise removal is performed will be described below. FIG. 5 is a diagram for explaining attributes of a noise removal processing pattern. As illustrated in FIG. 5, as processing patterns when the noise removal is performed, there are a processing pattern A, a processing pattern B, and a processing pattern C. The processing pattern A is a processing pattern in which there is a substitution for an alternative expression and feeling information is remained. The processing pattern B is a processing pattern in which there is a substitution for an alternative expression and no feeling information is remained.

The processing pattern C is a processing pattern in which there is no substitution for an alternative expression. In the processing pattern C, the presence or absence of feeling information depends on the content of processing target data. All of the processing pattern A, the processing pattern B, and the processing pattern C are to be counted when evaluation is performed.

Figure 6:
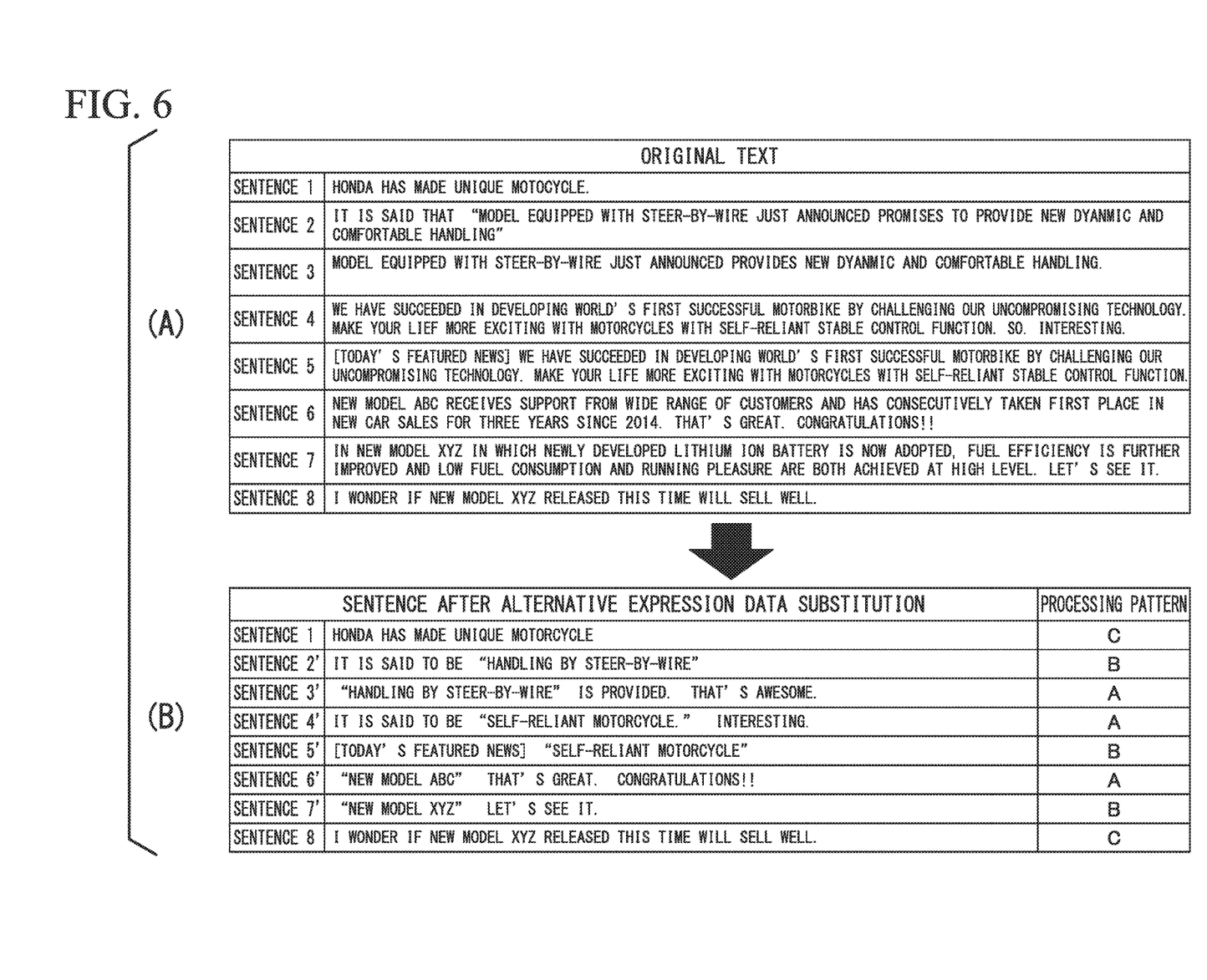
FIG. 6 is a diagram showing processing target data before and after noise removal.

Examples of processing target data before noise removal and processing target data after noise removal will be described below. Part (A) of FIG. 6 is a diagram showing processing target data before noise removal and part (B) of FIG. 6 is a diagram showing processing target data after noise removal. Part (B) of FIG. 6 also shows a processing pattern of each processing target data as well.

As illustrated in part (A) of FIG. 6, a portion corresponding to advertisement data corresponding to advertisement data illustrated in FIG. 2 is not included in Sentence 1 in which the text of processing target data is the expression "Honda has made a unique motorcycle." In this case, as illustrated in part (B) of FIG. 6, the text data of Sentence 1 after noise removal is the expression "Honda has made a unique motorcycle" as it is. In this case, the noise removal processing pattern is the processing pattern C.

A portion corresponding to advertisement data corresponding to the advertisement data No. 2 illustrated in FIG. 2 is included in Sentence 2 in which the text of processing target data is the expression "it is said that 'a model equipped with steer-by-wire just announced promises to provide new dynamic and comfortable handling'." In this case, as illustrated in part (B) of FIG. 6, text data of Sentence 2 after noise removal is the expression "it is said 'handling by a steer-by-wire'" obtained by substituting a portion corresponding to advertisement data corresponding to the text of the advertisement data No. 2 with the alternative expression data No. 2. In this case, the noise removal processing pattern is the processing pattern B. Furthermore, the text such as the expressions "just announced," "a model equipped with," and "promises" is deleted as data which accompanies advertisement data, which does not include a feeling expression.

A portion corresponding to advertisement data corresponding to the advertisement data No. 2 illustrated in FIG. 2 is included in Sentence 3 in which the text of processing target data is the expression "a model equipped with a steer-by-wire just announced provides new dynamic and comfortable handling. That's awesome."

In this case, as illustrated in part (B) of FIG. 6, in text data of Sentence 3 after noise removal, the portion corresponding to advertisement data corresponding to the text of the advertisement data No. 2 is substituted with the alternative expression data No. 2 and thus the expression "'handling by a steer-by-wire' is provided. That's awesome" is obtained. In this case, the noise removal processing pattern is the processing pattern A. As can be seen from this example, data determined to correspond to advertisement data is substituted with the alternative expression data even when a degree of matching of the processing target data with advertisement data is 100%. Likewise, processing target data of Sentence 4 illustrated in part (A) of FIG. 6 is substituted with data illustrated in part (B) of FIG. 6.

Also, when a degree of matching between the processing target data and advertisement data is calculated, weighting may be performed on words which are attributes of portions included in the processing target data and advertisement data.

For example, among words of text included in advertisement data, heavy weighting may be performed on verbs and adjectives and light weighting may be performed on conjunctions, particles, and the like.

For example, with regard to the expression "provides new dynamic and comfortable handling" in the advertisement data No. 2, a weight for "new," "dynamic," "comfortable," "handling," and "provides" may be set to "3" and a weight for "and" may be set to "1." It should be noted that weighting may be performed with more stages instead of the two stages of "3" and "1."

Subsequently, from a result of comparison in Step S201, the noise removing unit 14 determines whether or not there is a portion in which a degree of matching of the processing target data with advertisement data is a predetermined ratio or more in the processing target data and whether or not there is a portion corresponding to advertisement data in the processing target data (Step S203). When it is determined that there is the portion corresponding to advertisement data in the processing target data, the noise removing unit 14 selects alternative expression data (refer to FIG. 2) corresponding to the portion corresponding to advertisement data from the alternative expression dictionary 34 and selects alternative expression data substituting the portion corresponding to advertisement data included in the processing target data (Step S205). Then, the noise removing unit 14 substitutes the portion corresponding to advertisement data in the processing target data with the alternative expression data and removes a feeling expression in the portion corresponding to advertisement data included in the processing target data (Step S207). In this way, the noise removal processing ends. Furthermore, if it is determined in Step S203 that there is no portion corresponding to advertisement data in the processing target data, the noise removal processing ends immediately.

Referring to FIG. 3 again, subsequently, the analyzing unit 16 divides text included in the processing target data whose noise has been removed by the noise removing unit 14 at a word level and performs morphological analysis processing of associating brands of the same meaning (Step S107). For example, the analyzing unit associates alphabetic representation, representation in Chinese characters, representation in katakana in Japanese characters, representation in hiragana in Japanese characters, and the like which represent the same brand, handles them as data representing the same brand, and corrects variation in representation.

Subsequently, the analyzing unit 16 performs syntax analysis processing of ascertaining a relationship between a modification source and a modification destination of words included in the text and interprets a strength, multiple negation, a positive question, modification, comparison, and a dialect for words in expressions included in the text (Step S109).

Subsequently, the tagging unit 18 performs tagging of an "enterprise tag," a "topic tag," a "feeling tag," a "mirror tag," a "thermo tag," and a "risk tag" on text included in each of the processing target data (Step S111).

When a character string of dictionary data stored in the enterprise dictionary 30 is included in the processing target data, the tagging unit 18 assigns the "enterprise tag" to the character string in the processing target data. When a character string of dictionary data stored in the topic dictionary 32 is included in the processing target data, the tagging unit 18 assigns the "topic tag" to the character string in the processing target data. When a character string of dictionary data stored in the feeling dictionary 36 is included in the processing target data, the tagging unit 18 assigns the "feeling tag" to the character string in the processing target data. When a character string of dictionary data stored in the mirror dictionary 38 is included in the processing target data, the tagging unit 18 assigns the "mirror tag" to the character string in the processing target data. When a character string of dictionary data stored in the thermo dictionary 40 is included in the processing target data, the tagging unit 18 assigns the "thermo tag" to the character string in the processing target data. When a character string of dictionary data stored in the risk dictionary 42 is included in the processing target data, the tagging unit 18 assigns the "risk tag" to the character string in the processing target data.

Figure 7:
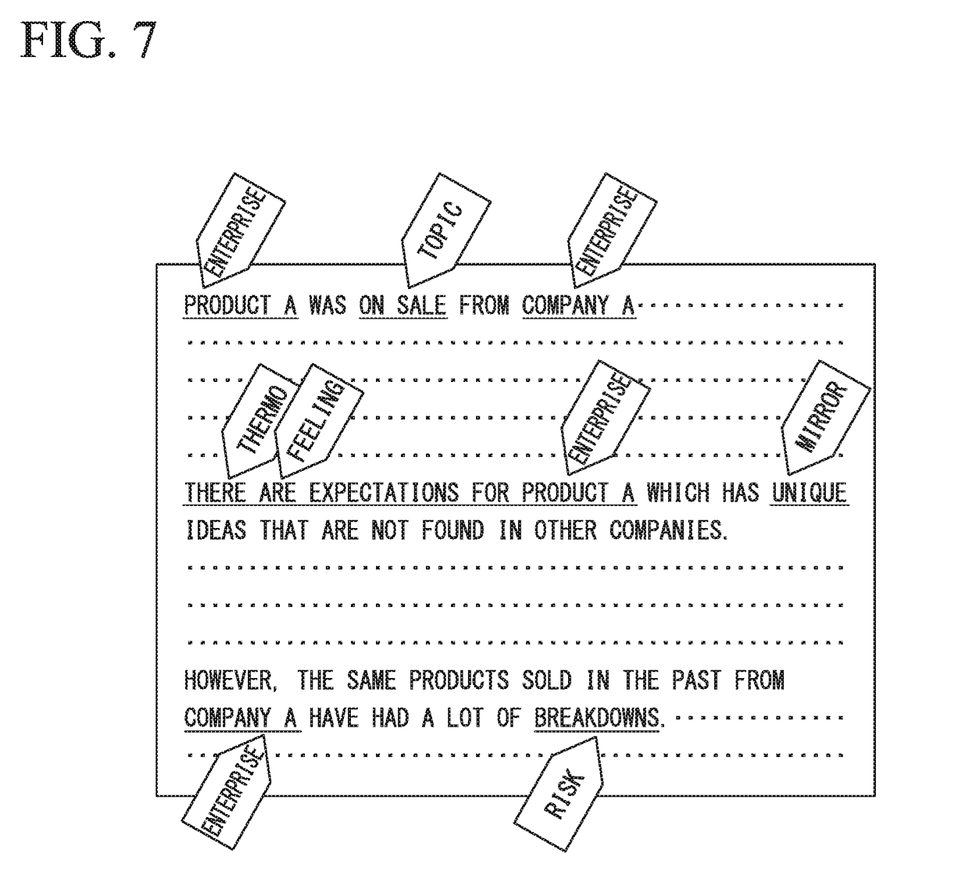
FIG. 7 is a diagram illustrating an example of processing target data which has been subjected to tagging processing in the embodiment.

FIG. 7 is a diagram illustrating an example of processing target data which has been subjected to tagging processing in the embodiment. In an example illustrated in FIG. 7, an "enterprise tag" is assigned to a character string such as "company A" and "product A," a "topic tag" is assigned to a character string such as "on sale," a "mirror tag" is assigned to a character string such as the word "unique," a "thermo tag" and a "feeling tag" are assigned to a character string such as the word "expected," and a "risk tag" is assigned to a character string such as the word "failure."

Subsequently, the scoring unit 20 performs scoring processing of calculating a mirror score, a thermo score, and a risk value on the basis of the processing target data tagged by the tagging unit 18 (Step S113). The scoring unit 20 performs calculation of a thermo score for each processing target data on the processing target data tagged by a combination of an "enterprise tag," a "topic tag," and a "thermo tag." The scoring unit 20 calculates an evaluation value using a mirror score and a thermo score for each of the assigned "enterprise tag" and "topic tag."

Figure 8:
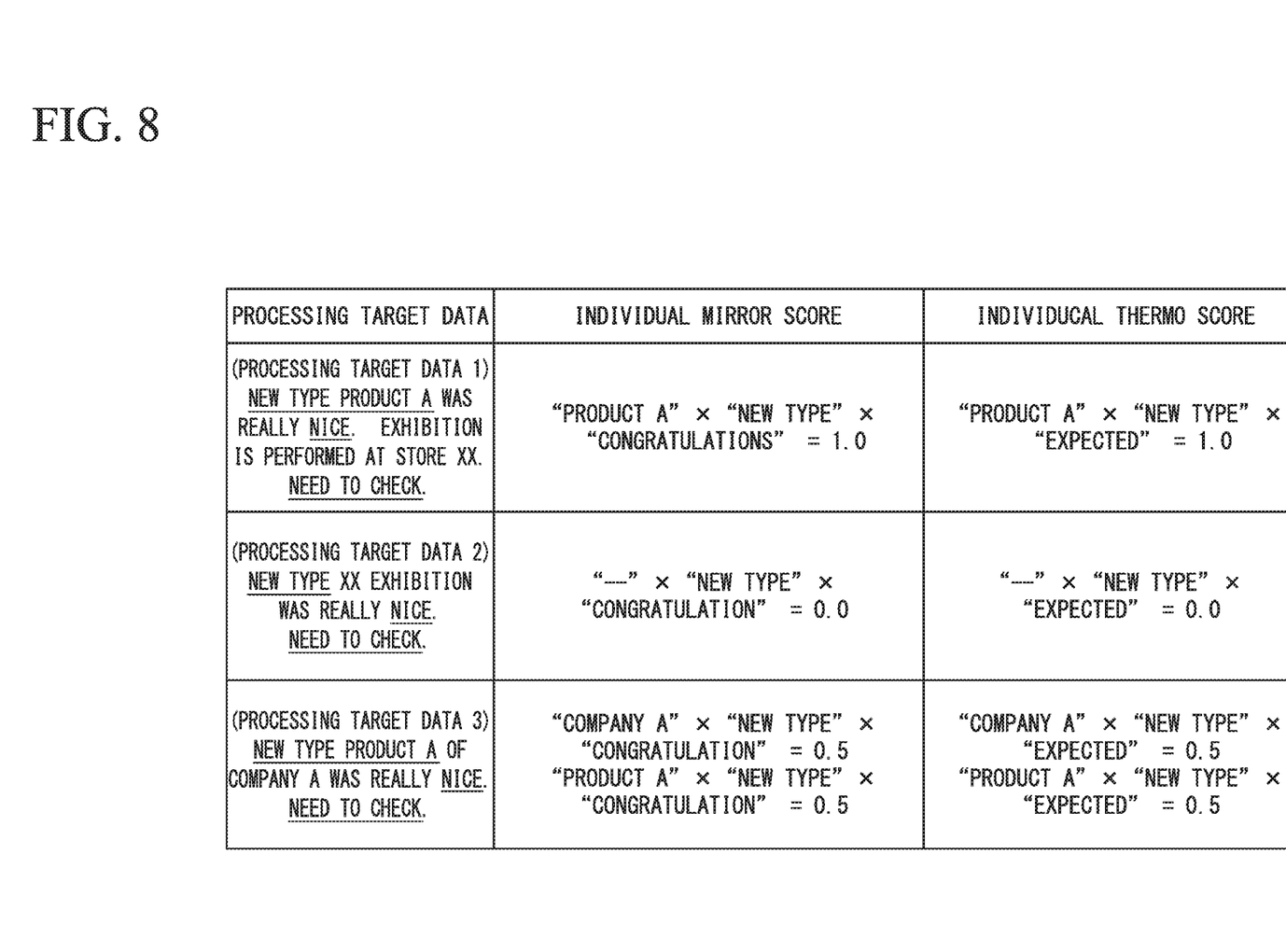
FIG. 8 is a diagram showing an example of scoring processing of the evaluation apparatus according to the embodiment.

For example, as illustrated in FIG. 8, "processing target data 1" includes a character string to which a "topic tag," i.e., a "new type model," is assigned, a character string to which an "enterprise tag," i.e., "product A," is assigned, a character string to which a "mirror tag (major classification 'congratulation')," i.e., the expression "is very cool," is assigned, and a character string to which a "thermo tag (keyword associated with 'expected')," i.e., the expression "need to check," is assigned. In this case, the scoring unit 20 calculates an individual mirror score as "1.0" by a combination of "product A," a "new type model," and "congratulation." Furthermore, the scoring unit 20 calculates an individual thermo score as "1.0" by a combination of "product A," a "new type model," and the word "expected."

Also, "processing target data 2" includes a character string to which a "topic tag," i.e., a "new type model," is assigned, a character string to which a "mirror tag (major classification 'congratulation')," i.e., the expression "is very cool," is assigned, and a character string to which a "thermo tag (keyword associated with the word 'expected')," i.e., the expression "need to check," is assigned. In this case, since there is no character string to which an "enterprise tag" is assigned, the scoring unit 20 sets an individual mirror score and an individual thermo score to "0.0."

"Processing target data 3" includes a character string to which a "topic tag," i.e., a "new type model," is assigned, character strings to which an "enterprise tag," i.e., "product A" and "company A," is assigned, a character string to which a "mirror tag (major classification 'congratulation')," i.e., the expression "is very cool," is assigned, and a character string to which a "thermo tag (keyword associated with the word 'expected')," i.e., the expression "need to check." In other words, "processing target data 3" includes two character strings, i.e., "product A" and "company A" to which the "enterprise tag" is assigned. In this case, the scoring unit 20 calculates an individual mirror score and an individual thermo score for each of the two character strings.

Here, "processing target data 3" includes a positive expression such as the expression "exhibition is very cool," but this may not express product A or company A positively. In other words, it can also be interpreted that the expression "exhibition is very cool" is a positive expression about a method for "exhibition." In this case, the scoring unit 20 calculates an individual mirror score and an individual thermo score lower than those of processing target data 1 which directly positively expresses product A. For example, the scoring unit 20 calculates the individual mirror score to be "0.5" by a combination of "product A," a "new type model," and "congratulation" and calculates the individual mirror score to be "0.5" by a combination of "company A," a "new type model," and "congratulation." Furthermore, the scoring unit 20 calculates the individual thermo score to be "0.5" by a combination of "product A," a "new type model," and the word "expected" and calculates the individual thermo score to be "0.5" by a combination of "company A," a "new type model," and the word "expected."

Subsequently, the scoring unit 20 performs calculation of a risk value (hereinafter referred to as an "individual risk value") for each processing target data on the processing target data tagged by a combination of an "enterprise tag," a "topic tag," and a "risk tag." For example, the scoring unit 20 counts the number of "risk tags" and performs scoring with one "risk tag" as one point.

Subsequently, after individual scoring processing for all of the processing target data has been completed, the scoring unit 20 performs weighting processing on the basis of a type of collection source of each processing target data. The scoring unit 20 performs weighting on data including a term stored in the mirror dictionary 38 and data including a term stored in the thermo dictionary 40 on the basis of types of media M (information media) and calculates a mirror score and a thermo score which will be described later. For example, an average spoken amount for a brand to be evaluated per day for each medium may be calculated on the basis of statistical data in the past and weighting be performed so that an influence of all media becomes uniform. For example, when a weight of a newspaper is set to a reference value, "1," a weight, i.e., "2," larger than that of a newspaper is set to television with an amount of speech lower than that of a newspaper. Furthermore, a weight, i.e., "0.1," smaller than that of a newspaper is set to an SNS with an amount of speech larger than that of a newspaper.

Subsequently, the scoring unit 20 performs sentiment determination processing of determining whether the content of the processing target data is a positive expression or a negative expression on the basis of the "feeling tag" assigned to the processing target data. The scoring unit 20 determines whether each of the processing target data represents positive content or negative content for each mirror score and thermo score.

For example, when the number of places expressing positive expressions (number of feeling tags of positive expressions) is more than the number of places expressing negative expressions (number of feeling tags of negative expressions) in one item of processing target data, the scoring unit 20 determines that the processing target data is a positive expression as a whole. Furthermore, when the number of places expressing negative expressions is more than the number of places expressing positive expressions in one item of processing target data, the scoring unit 20 determines that the processing target data is a negative expression as a whole. When the number of places expressing positive expressions is the same as the number of places expressing negative expressions in one item of processing target data, the scoring unit 20 determines that the processing target data is a neutral expression as a whole. Furthermore, the scoring unit 20 determines processing target data to which no "feeling tag" is assigned to be emotionless.

Subsequently, the scoring unit 20 calculates final thermo and mirror scores on the basis of the processing target data on which the sentiment determination processing has been performed. For example, the scoring unit 20 calculates a sum of individual mirror scores of processing target data determined to be positive expressions and a sum of individual mirror scores of processing target data determined to be negative expressions for each brand to be evaluated. Furthermore, the scoring unit 20 calculates, as the final mirror score, a value obtained by subtracting the sum of the individual mirror scores of the processing target data determined to be negative expressions from the sum of the individual mirror scores of the processing target data determined to be positive expressions.

Also, for example, the scoring unit 20 calculates a sum of individual thermo scores of processing target data determined to be positive expressions and a sum of individual thermo scores of processing target data determined to be a negative expression for each brand to be evaluated. Furthermore, the scoring unit 20 calculates, as the final thermo score, a value obtained by subtracting the sum of the individual thermo scores of the processing target data determined to be negative expressions from the sum of the individual thermo scores of the processing target data determined to be positive expressions. The scoring unit 20 stores the calculated mirror and thermo scores in the storage 24.

Subsequently, the scoring unit 20 calculates a final risk value on the basis of the processing target data on which the sentiment determination processing has been performed and determines a risk level. The risk level is determined to be, for example, a "high" risk, a "medium" risk, and a "low" risk using a predetermined threshold value as a reference. Here, the scoring processing ends.

Subsequently, the scoring unit 20 performs evaluation result output processing of causing the display unit 22 to display a calculated mirror score, thermo score, risk value, and the like. The scoring unit 20 generates information for enabling display of an image in which the mirror score, the thermo score, and the risk value are compared and causes the display unit 22 to display the information. Moreover, an evaluation value is calculated with reference to the mirror score, the thermo score, and the risk value and is output to the display unit 22 as an evaluation result (Step S115).

The calculated mirror score, thermo score, and risk value may be mapped onto a three-dimensional space so that an evaluation value is calculated by a support vector machine.

According to the evaluation apparatus 1 in the above-described embodiment, gaps between an image of a brand expected by an enterprise or an organization and responses of the public (consumers) are evaluated regardless of noise included in acquired information and the specific content of the responses by the public can be appropriately evaluated in accordance with activities of the enterprise or the organization. Furthermore, when the gaps between the image of the brand and the responses of the public are evaluated, the gaps and certainty of information which has been disclosed in media can be appropriately evaluated and a degree of risk of the enterprise can also be evaluated.

Figure 9:
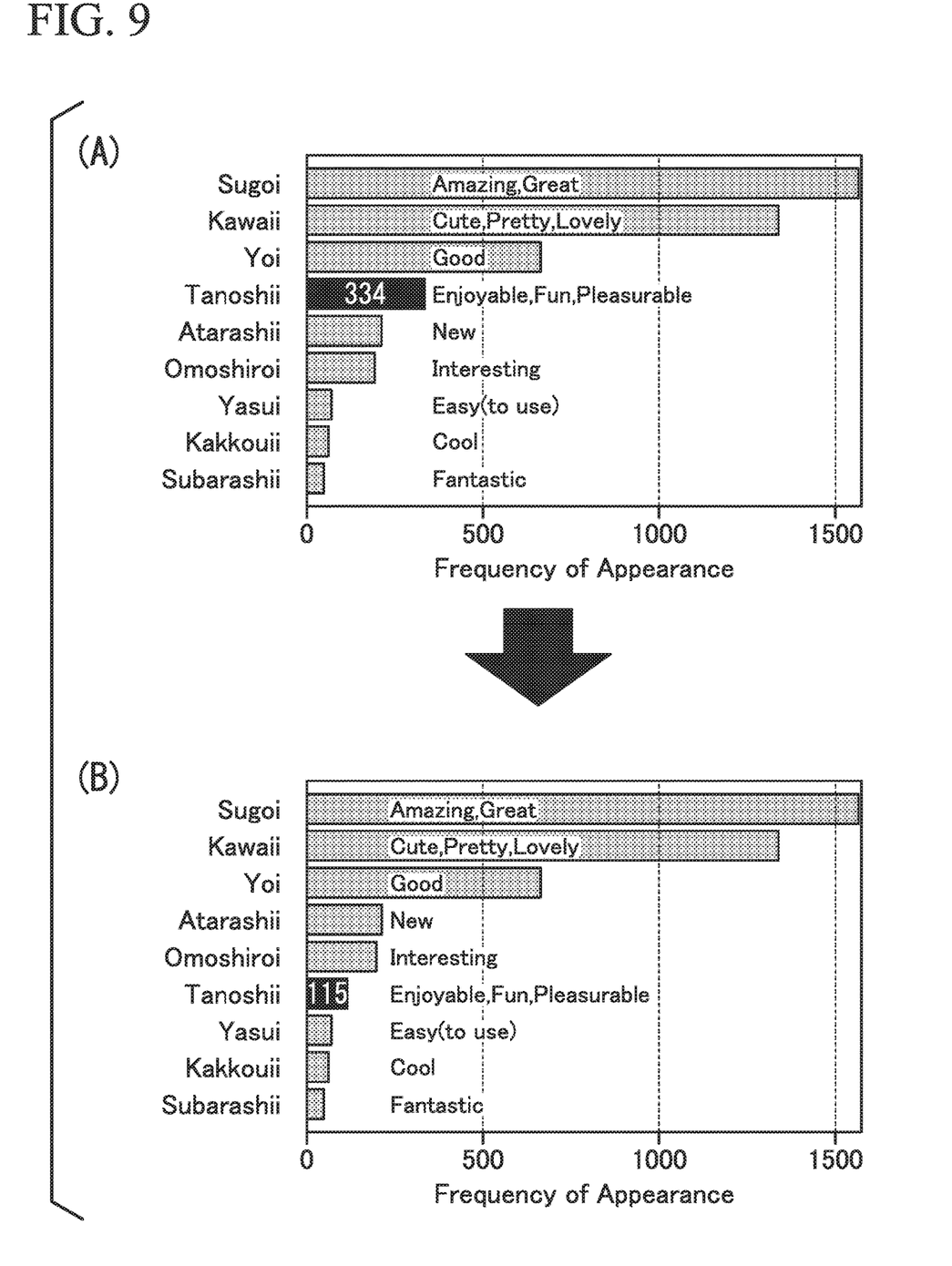
FIG. 9 is a diagram for explaining results when noise removal has been performed and has not been performed by a noise removing unit.

Also, for example, text to which a feeling tag is assigned greatly affects evaluation in the scoring unit 20. Thus, when text to which the feeling tag is assigned is remained as noise, this text degrades the accuracy with respect to the evaluation. In this regard, according to the evaluation apparatus 1 in the above-described embodiment, when the noise removal processing is performed by the noise removing unit 14, a feeling expression included in advertisement data is removed from a feeling expression included in processing target data. For example, FIG. 9 illustrates an example in which noise removal has been performed and has not been performed by the noise removing unit 14. When the noise removal has not been performed, as illustrated in (A) of FIG. 9, there were 334 items of text containing the word "exciting," but when the noise removal has been performed by the noise removing unit 14, as illustrated in (B) of FIG. 9, there were 115 texts containing the word "exciting." In this way, noise included in the processing target data can be appropriately removed. Thus, text included in advertisement data can be removed from text to which a "feeling tag" is assigned by the tagging unit 18. Therefore, deterioration of accuracy with respect to evaluation in the scoring unit 20 can be minimized.

Although the embodiment for carrying out the present invention has been described above, the present invention is not limited to the embodiment at all and various modifications and substitutions are possible without departing from the gist of the present invention.

What is claimed is:

1. An evaluation apparatus, comprising:
   a processor; and
   a memory including computer program code,
   wherein the memory and the computer program code are configured to, with the processor, cause the evaluation apparatus at least to:
   acquire provision information which is associated with a target object and provided by an owner of the target object via a medium;
   acquire post information posted by a poster via the medium;
   compare the provision information and the post information at a word level by decomposing text included in the provision information and the post information, and calculating a degree of matching between the provision information and the post information according to an extent words included in the text of the provision information are included in the post information;
   remove, as noise, at least feeling information in the provision information from post information in which the degree of matching of the post information with the provision information is a predetermined ratio or more among pieces of post information acquired by the evaluation apparatus;
   evaluate the target object on the basis of post information whose noise has been removed by the noise removing unit;
   map an evaluation result of the evaluation of the target object onto a three-dimensional space; and
   output the mapped evaluation result to a display device.

2. The evaluation apparatus according claim 1, wherein removing the noise comprises substituting a portion in the post information including the feeling information which corresponds to the provision information with alternative information obtained by removing the feeling information from the provision information.

3. The evaluation apparatus according to claim 1, wherein the memory and the computer program code are further configured to, with the processor, cause the evaluation apparatus at least to perform weighting on attributes of portions included in the post information and the provision information.

4. The evaluation apparatus according to claim 1, wherein the memory and the computer program code are further configured to, with the processor, cause the evaluation apparatus at least to selectively acquire post information including impressions of the provision information.

5. The evaluation apparatus according to claim 4, wherein the post information is post information associated with impressions of provision information transmitted from a predetermined transmission source.

6. The evaluation apparatus according to claim 1, wherein the memory and the computer program code are further configured to, with the processor, cause the evaluation apparatus at least to:
perform syntax analysis on a sentence included in post information which is acquired by the post information acquiring unit and whose noise has been removed by the noise removing unit; and
perform scoring on an analysis result in the syntax analyzing unit,
wherein the scoring comprises associating provision information acquired by the evaluation apparatus with the scored analysis result.

7. The evaluation apparatus according to claim 6, wherein the scoring comprises weighting on an analysis result analyzed by the syntax analyzing unit.

8. A noise removal apparatus, comprising:
a processor; and
a memory including computer program code,
wherein the memory and the computer program code are configured to, with the processor, cause the noise removal apparatus at least to:
acquire provision information which is associated with a target object and provided by an owner of the target object via a medium;
acquire post information posted by a poster via the medium;
compare the provision information and the post information at a word level by decomposing text included in the provision information and the post information, and calculating a degree of matching between the provision information and the post information according to an extent words included in the text of the provision information are included in the post information; and
remove, as noise, at least feeling information in the provision information from post information in which the degree of matching of the post information with the provision information is a predetermined ratio or more among pieces of post information acquired by the noise removal apparatus.

9. An evaluation method comprising:
acquiring, by a computer, provision information which is associated with a target object and provided by an owner of the target object via a medium;
acquiring, by the computer, post information posted by a poster via the medium;
comparing, by the computer, the provision information and the post information at a word level by decomposing text included in the provision information and the post information, and calculating a degree of matching between the provision information and the post information according to an extent words included in the text of the provision information are included in the post information;
removing, by the computer, as noise, at least feeling information in the provision information from post information in which the degree of matching of the post information with the provision information is a predetermined ratio or more among pieces of acquired post information;
evaluating, by the computer, the target object on the basis of post information whose noise has been removed;
mapping, by the computer, an evaluation result of the evaluation of the target object onto a three-dimensional space; and
outputting, by the computer, the mapped evaluation result to a display device.

10. A computer program, embodied on a non-transitory computer readable medium, the computer program, when executed by a processor, causes the processor to:
acquire provision information which is associated with a target object and provided by an owner of the target object via a medium;
acquire post information posted by a poster via the medium;
compare the provision information and the post information at a word level by decomposing text included in the provision information and the post information, and calculating a degree of matching between the provision information and the post information according to an extent words included in the text of the provision information are included in the post information;
remove, as noise, at least feeling information in the provision information from post information in which the degree of matching of the post information with the provision information is a predetermined ratio or more among pieces of acquired post information;
evaluate the target object on the basis of post information whose noise has been removed;
map an evaluation result of the evaluation of the target object onto a three-dimensional space; and
output the mapped evaluation result to a display device.

* * * * *